United States Patent [19]

Mattson

[11] 4,210,128
[45] Jul. 1, 1980

[54] BLACK LIQUID ABSORBING SOLAR COLLECTOR

[75] Inventor: John P. Mattson, Duxbury, Mass.

[73] Assignee: Solarspan, Inc., Duxbury, Mass.

[21] Appl. No.: 938,026

[22] Filed: Aug. 30, 1978

Related U.S. Application Data

[63] Continuation-in-part of Ser. No. 914,388, Jun. 12, 1978.

[51] Int. Cl.² .............................. F24J 3/02; F28F 7/00
[52] U.S. Cl. ..................................... 126/444; 126/446; 126/449; 126/450; 126/900; 165/81; 165/82; 165/83
[58] Field of Search ............... 126/270, 271, 443, 444, 126/445, 446, 448, 449, 450, 900; 237/1 A; 165/81, 82, 83

[56] References Cited

U.S. PATENT DOCUMENTS

| | | | |
|---|---|---|---|
| 3,916,871 | 11/1975 | Estes | 126/271 |
| 3,987,784 | 10/1976 | Godrick | 126/271 |
| 4,010,733 | 8/1977 | Moore | 126/271 |
| 4,026,268 | 5/1977 | Bartos | 126/270 |
| 4,033,325 | 7/1977 | Walker | 126/271 |
| 4,038,967 | 8/1977 | Stout et al. | 126/271 |
| 4,055,163 | 10/1977 | Costello et al. | 237/1 A |
| 4,068,652 | 1/1978 | Worthington | 126/270 |
| 4,079,781 | 3/1978 | Wesseltoft | 165/76 |
| 4,098,265 | 7/1978 | Gravely | 126/271 |
| 4,114,599 | 9/1978 | Stephens | 126/271 |

FOREIGN PATENT DOCUMENTS

2601295  7/1977  Fed. Rep. of Germany ........... 126/121

Primary Examiner—James C. Yeung
Assistant Examiner—Daniel J. O'Connor
Attorney, Agent, or Firm—Edward A. Gordon

[57] ABSTRACT

A solar energy collector wherein the absorber means comprises a black liquid absorber for converting solar energy to thermal energy and absorbing the thermal energy. The solar energy collector includes an upper cover having a plurality of raised chamber modules each having surfaces angularly disposed to the cover surface for collecting and transmitting solar energy to the black liquid absorber. Means are provided for exposing the black liquid absorber to solar radiation and comprise an upper and lower surface means transparent to solar energy and defining a plurality of elongated channel means for conveying the black liquid absorber therebetween. Inlet means are provided for introducing the black liquid abosrber to the channel means and outlet means are provided for conveying away the black liquid absorber and absorbed thermal energy. A lower cover means is provided having a plurality of raised chamber modules each having surfaces angularly disposed to the cover surface, transparent to solar radiation, and corresponding to the upper cover means. The upper and lower cover means are disposed in abutting relationship, respectively, with the upper and lower surface means at least along the elongated perimeters whereby the chamber modules form a plurality of heat chambers for maximizing solar energy collection and minimizing heat loss. In the preferred embodiment, upper and lower wall means are disposed within the upper and lower cover means and about the elongated channel means. The upper and lower wall means are transparent to solar radiation and have a configuration and are positioned relative to the channel means so that (1) when the collector is exposed to solar radiation, will provide for mechanical rigidity of the collector; (2) minimize heat loss by conduction, convection and radiation; (3) control thermal expansion of the channel surfaces, and (4) control the volume of black liquid absorber per unit area carried by the channel means.

10 Claims, 9 Drawing Figures

BLACK LIQUID ABSORBING SOLAR COLLECTOR

This application is a continuation-in-part of my co-pending application, Ser. No. 914,388, filed June 12, 1978, and entitled: Solar Energy Tracking Collector.

BACKGROUND OF THE INVENTION (1) Field of the Invention

This invention relates to solar energy collectors and, more particularly, to a black liquid absorbing collector.

(2) Description of the Prior Art

Various solar collectors have been suggested for use in conjunction with a black liquid solar energy absorber. In some prior systems the use of a black liquid absorber is mentioned in connection with the black metallic solar energy absorbing surface. PERFORMANCE ANALYSIS OF A BLACK LIQUID ABSORBING COLLECTOR, Proceedings of the 1977 Annual Meeting of the ASISES, Volume 1, Section 1-13, describes a black liquid absorber which flows between two transparent sheets of glass in a flat glass sandwichlike collector assembly.

The use of a heat metallic surface in conjunction with a black absorbing liquid has the disadvantage in that the collector is continually affected by solar energy and cannot be turned off when not in use.

The use of a black liquid absorber in rigid flat sandwichlike assembly has the disadvantage in that it does not accommodate and/or control changes due to thermal expansion of the collector or black liquid absorber or pressure changes resulting from liquid flow rate changes. Additionally, such solar collectors do not provide for maximum solar energy absorption per given unit area or provided for minimizing heat loss. While such flat collectors can be installed on an existing building with a flat roof, they are not readily adaptable to existing structures having inclined roofs and are particularly not suitable for inclined roofs which run other than in a generally east-west direction.

SUMMARY OF THE INVENTION

The invention makes possible a highly efficient solar to thermal energy conversion by providing for an improved black liquid absorbing collector which maximizes solar energy absorption while minimizing heat loss such as by conduction, convection and radiation. The invention also makes possible a solar energy collector which will not be affected by the sun when not in use and which can function, for example, as an aesthetic skylight or mood setter or enhance plant growth.

In general, the black liquid absorbing collector comprises upper and lower covers with at least the upper cover having a plurality of raised heat chamber modules each having surfaces angularly disposed to the cover surface and transparent to solar energy. Disposed between the upper and lower covers are flexible means for exposing a black solar energy to thermal energy conversion absorbing fluid comprising upper and lower surfaces transparent to solar energy and defining a plurality of elongated channel means between which the black liquid absorber flows. By the term "black liquid absorber" as used herein it is meant a liquid or fluid which has a blackening agent dispersed therein, including an agent for dyeing the liquid black, whereby the liquid so blackened when exposed to solar energy converts the solar energy to thermal energy and absorbs the thermal energy. Inlet means are provided for introducing the black liquid absorber to one end of the elongated channel means for exposing said black liquid to solar radiation and outlet means at the other end of the elongated channel means for conveying the black liquid absorber and absorbed thermal energy away from the channel means. Disposed within the cover means and about the means for exposing the black liquid absorber to solar radiation are upper and lower wall means having at least the upper wall transparent to solar radiation and having a configuration and being positioned relative to said black liquid exposing means so that when said collector is exposed to solar radiation (1) will provide for mechanical rigidity of the collector, (2) will reduce heat loss by conduction, convection and radiation, (3) will control thermal expansion of the black liquid absorber exposing means, and (4) will control the maximum volume of black liquid absorber fluid per unit area carried by the elongated channel means for exposing the black liquid absorber to solar radiation. In preferred embodiments the elongated channel means for exposing the black liquid absorber to solar radiation has a serrated or saw-toothed configuration and is sufficiently flexible to accommodate thermal expansion as well as expansion due to fluid pressure.

In operation, when the solar collector of the present invention is connected to a solar collector system comprising, for example, a source or holding tank of black liquid absorber fluid, a pump means for pumping the black liquid absorber fluid, thermal energy exchange means, and a thermal energy storage tank means, the black liquid absorber is pumped through the plurality of elongated channel means and is exposed to solar radiation whereby it converts the solar energy to thermal energy, is heated, and conveyed away to the heat exchange means where thermal energy is removed and stored in a thermal energy storage tank, the black liquid absorber being recycled back to the solar collector for further heating.

In preferred embodiments, when temperature of the storage tank reaches a desired level, a thermal sensor, for example, will shut down the black liquid absorber pump and, because the system is not pressurized, permit the black liquid absorber to automatically drain into the holding tank whereby the collector will not be affected by solar radiation and no further heating will take place. The collector may remain empty, or another colored liquid may be selectively pumped into the collector from a storage system containing a plurality of different colored liquids. Plant growth could be enhanced, for example, by filling the collectors during the non-heating period with a magenta colored liquid. In the empty condition, or by filling the collectors with a clear or colored liquid would permit the collectors to serve as skylights. When further heating is desired, or when a predetermined temperature is reached, the colored liquid would be returned to the storage tank and circulation of the black liquid absorber resumed.

In some preferred embodiments of the invention, the upper cover of the solar collector is molded or formed as one integral sheet having a plurality of raised multifaced prismatic-like structures which collect and transmit solar radiation to the black liquid absorber fluid and form heat chambers which may be called prism heat chambers which serve to minimize heat loss. The raised multifaced prismatic-like structures will be referred to hereinafter as prisms, or chamber modules, for simplicity of discussion and is not used in a limiting sense. The prisms, or chamber modules, may have a variety of shapes and configurations for reasons which will be explained in greater detail hereinafter. The faces of the prisms are so arranged and constructed with respect to angle and direction for a given latitude of the earth's surface to provide for optimum transmission of incident solar radiation. Since the angle of maximum insulation varies from summer to winter due to the axis of the earth's rotation being tilted or inclined to the axis of its path around the sun by 23½°, prisms with the proper configuration of angle and direction are provided to produce optimum collectors of incident solar radiation. The surfaces of the prisms also serve to collect incident solar radiations, which would normally be lost by reflection, by multiple reflections from adjacent prism surfaces and directing them to the energy or heat absorbing black liquid.

As mentioned above, the tilting of the earth has the result that, with reference to the North Pole, the axis tilts toward the sun on June 21, the Summer Solstice, and away from it on December 21, the Winter Solstice. The effect of the inclination of the axis of rotation on the angle of incidence of the sun rays is that on June 21 the sun's rays are perpendicular to the earth's surface at latitude 23½° North. On December 21, the situation is reversed and the sun's rays are perpendicular to the earth at latitude 23½° South. Thus it can be seen that at 45° N. latitude, for example, the sun's maximum height above the horizon at local noon is 21½° on December 21, and 69½° on June 21. Thus the angle for optimum intensity of solar radiation varies with seasonal changes.

In some preferred embodiments of the invention the collector is constructed so that configuration direction and angle of surfaces of certain prisms are optimum for the Winter Solstice of the sun and the configuration, direction and angle of surfaces of certain other prisms are optimum for the Summer Solstice of the sun. It is understood that the east to west movement of the sun resulting from the earth's rotation is accommodated for by the directions of the principal prism surfaces.

In some preferred embodiments, the collector is provided with a plurality or series of prisms, each of which series are designed to provide optimum collection of incident solar radiation over a particular angular movement of the sun with respect to the local position of the collector. As the sun changes its angular relationship, another series of prisms will collect the optimum incident solar radiation. The different prisms may be arranged in tiers, series, parallel, or combinations thereof, for example, to achieve maximum collection. Thus the solar collector of the present invention provides for fixed tracking of the sun during the east to west travel and during the seasonal variations.

In some preferred embodiments of the invention the bottom cover of the collector is similar to the top cover in configuration and material to provide a dual sided collector. The bottom cover is then inverted and sealed to the upper cover with the means for exposing the black liquid absorber fluid disposed therebetween as will be explained in greater detail hereinafter.

Many of the above described features of the invention may be utilized independently of some of the others, but they are preferrably combined into one embodiment which is highly efficient in converting solar energy to heat energy.

The invention accordingly comprises the apparatus processing the construction, combination of elements and arrangement of parts which are exemplified in this disclosure and the scope and application of which will be indicated in the claims.

DESCRIPTION OF THE PREFERRED EMBODIMENT(S)

For a fuller understanding of the nature and desired objects of the invention, reference should be had to the following detailed description taken in connection with the accompanying drawing wherein like reference characters denote corresponding parts throughout the several views and wherein.

Figure 1:
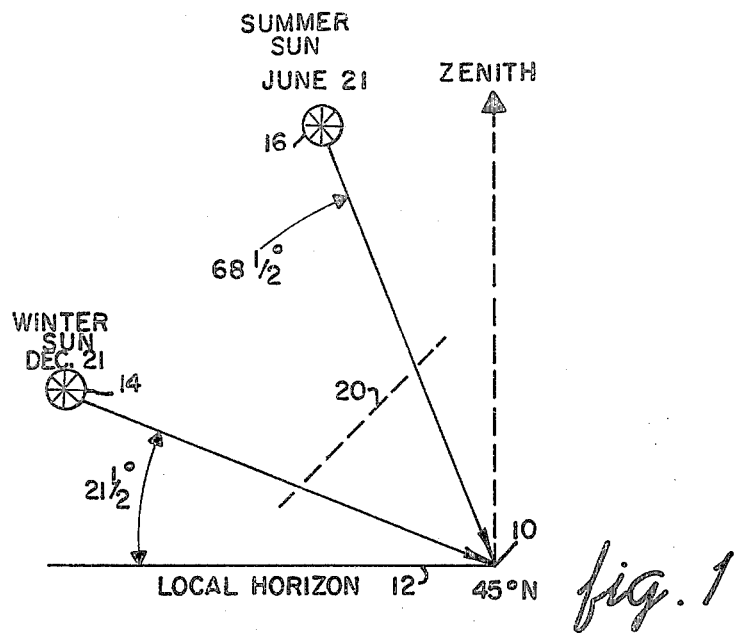
FIG. 1 is a schematic representation of the angle of incidence of solar energy as a function of the annual variation from winter to summer at 45° N. latitude.

Referring now more particularly to FIG. 1, there is illustrated the effect on incident solar radiation from the tilting of the earth on its axis of rotation. As mentioned previously, on June 21, the summer solstice, the sun's rays are perpendicular to the earth's surface at latitude 23½° North, and on December 21 the sun's rays are perpendicular to the earth at latitude 23½° South. At 45° N. latitude, as shown at 10, the sun's maximum height above the local horizon 12 is 21½° on December 21, position 14, and 68½° on June 21, position 16. Thus it can be seen that angle for optimum intensity of solar radiation varies from winter sun to summer sun. Thus it can be understood that optimum collection of solar radiation would be obtained by tracking the sun's increment relative to the earth.

Figure 2:
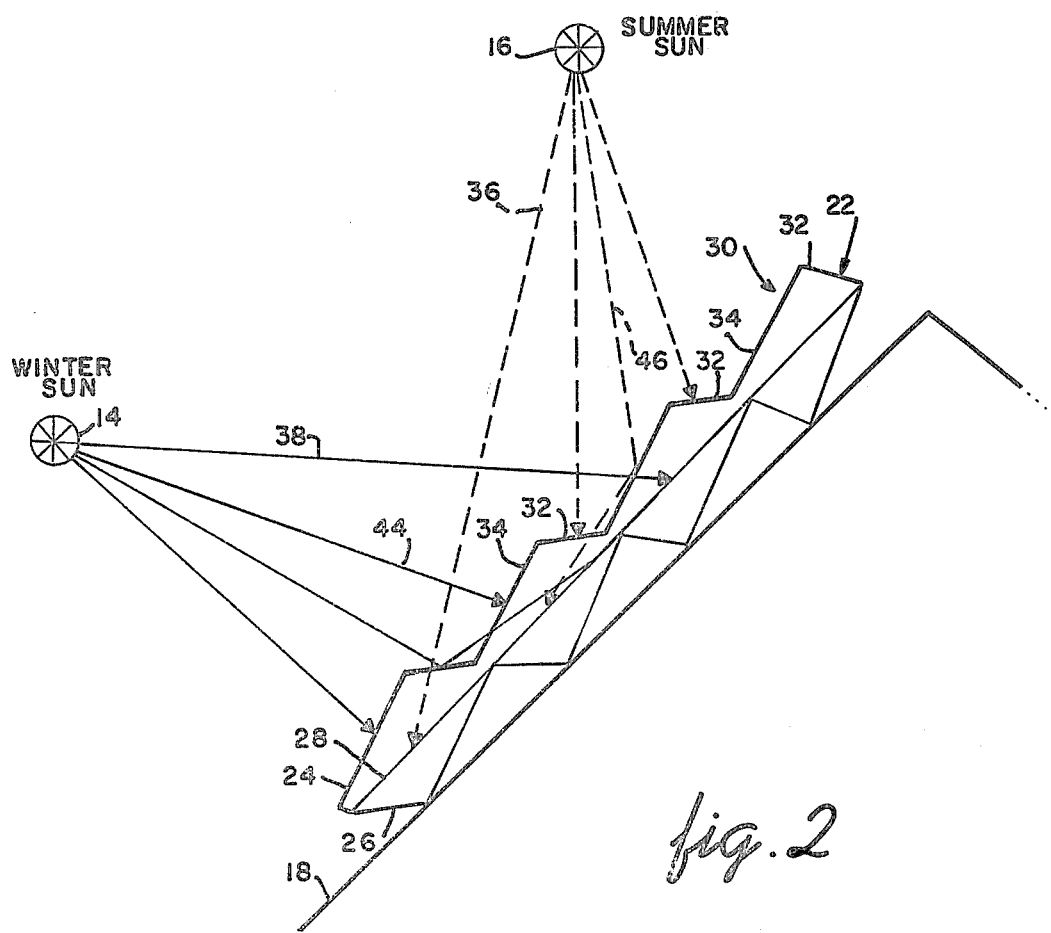
FIG. 2 is a schematic, diagrammatic sectional view of a solar energy tracking collector illustrating the tracking-collecting feature from summer sun to winter sun.
Figure 3:
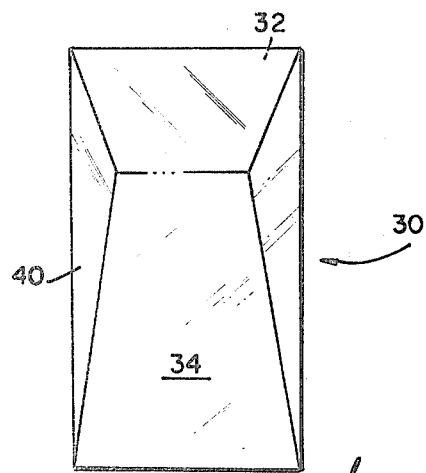
FIG. 3 is a top perspective view of a prism collector of FIG. 2.

Referring now to FIGS. 2 and 3, there is shown a roof represented by the line 18 having the same relative position as dotted line 20 of FIG. 1 with respect to the position of the winter sun 14 and summer sun 16. Positioned on roof 18 is a solar energy collector 22 having a cover 24, and a base 26 and an energy receiving means 28 and being more particularly constructed as described with respect to embodiment of FIG. 4. The collector 22 is provided with a plurality of prisms 30 having surfaces 32 whose angle with respect to the energy receiving means 28 is optimum for the summer solstice position of the sun 16 as shown by solar radiation 36, and surfaces 34 whose angle with respect to the energy receiving means 28 is optimum for the winter solstice position of sun 14 as shown by solar radiation 38. Surfaces 40 and 42 also provide for collection of the solar radiation as the sun moves laterally relative to the earth's rotation. By the term collection as used herein it is meant collection by direct incidence and by reflection as illustrated by rays 44 and 46. Thus it can be seen that the solar collector of the present invention can be provided with a plurality of prisms having surfaces which are prearranged to provide optimum collection of incident solar radiation over a particular angular movement of the sun relative to local position on earth of the solar collector.

Figure 4:
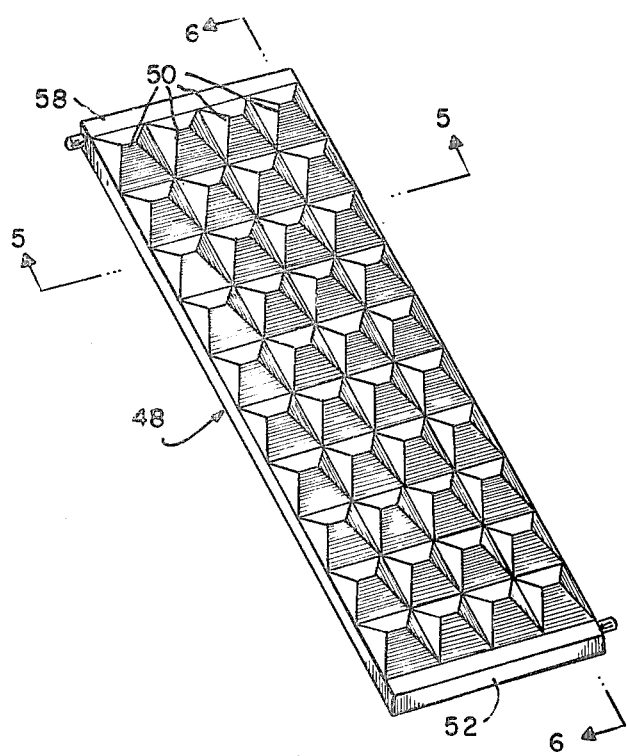
FIG. 4 is a perspective view of a solar energy collector embodying the invention.
Figure 5:
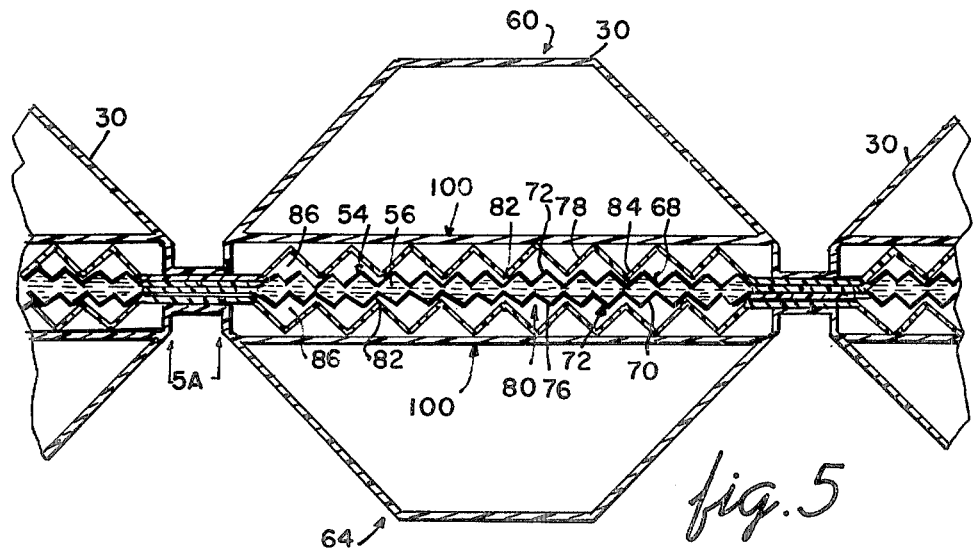
FIG. 5 is a fragmentary sectional view taken along the lines 5—5 in FIG. 4.
Figure 6:
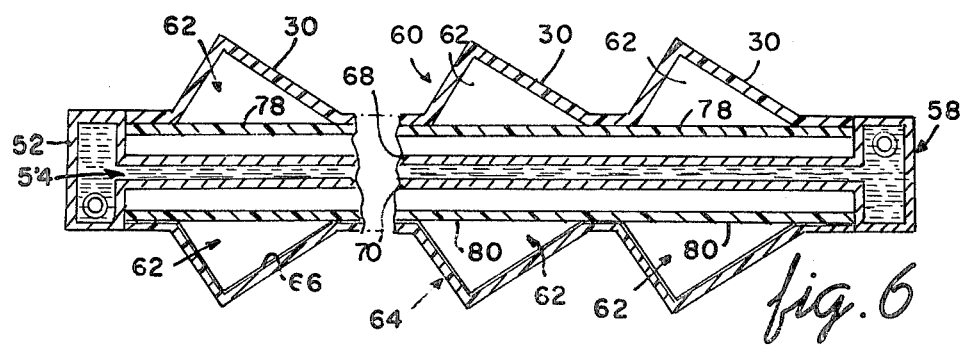
FIG. 6 is a fragmentary sectional view taken along the lines 6—6 in FIG. 4.

Referring now to FIGS. 4, 5 and 6, there is illustrated a solar energy collector system shown generally at 48 and comprising four solar energy collectors 50 connected in parallel and having an inlet manifold means 52 for introducing a black liquid absorber fluid to the means shown generally at 54 for exposing said black liquid absorber 56 to solar radiation and outlet manifold means 58 for conveying said black liquid absorber and absorbed thermal energy away from said black liquid exposing means 54. Each solar collector is provided with an upper cover which is molded or formed as one integral structure having a series of raised multifaced prism heat chambers 62 formed by prisms 30 which collect and transmit solar radiation to the black liquid absorber 56 carried by the solar radiation exposing means 54. The lower cover or base 64 is molded or formed in the same manner and configuration as upper cover 60 and is inverted to serve as the lower cover or base 64. Lower cover 64 may be used to collect and transmit solar radiation to the black liquid absorber 56 in the same manner as upper cover 60 and thus provides a dual-sided solar energy collector. When lower cover 64 serves as the base of the collector, it may be provided with a heat-reflective coating 66 which serves to minimize heat loss from the black liquid absorber.

The means 54 for exposing the black liquid absorber to solar radiation comprises an upper surface 68 and a lower surface 70 which together define a plurality of elongated saw-tooth, or serrated, channels 72 and are transparent to solar radiation. The upper and lower surfaces 68 and 70 are flexible and expand and contract due to thermal expansion of the surfaces and to changes in the volume of liquid carried therebetween as a function of the heating, cooling and flow rate of the liquid. A saw-tooth channel configuration is preferable since it provides for a greater surface area for exposing the black liquid absorber to solar radiation. The black liquid absorber is passed between the upper and lower surfaces 68 and 70 as a thin curtain of liquid having a large area to unit volume ratio. When connected in parallel, upper and lower surfaces 68 and 70 are sealed together by the upper and lower rib areas 74 and 76 over the length A.

Disposed within the upper and lower cover means 60 and 64 and about the means 54 for exposing the black liquid absorber to solar radiation are upper and lower wall support means 78 and 80 which are transparent to solar energy. The upper and lower wall means 78 and 80 herein referred to as wall means or wall support means are provided with a serrated or saw-tooth configuration similar to the black liquid exposing means 54. While the upper and lower wall support means 78 and 80 preferably have a saw-tooth configuration, they may be formed as sheet members. The position of the upper and lower wall means relative to the upper and lower surface means 68 and 70 may range from point contact along the surfaces at points 82 of the upper and lower wall means 78 and 80 to a predetermined gap distance whereby when said collector is exposed to solar radiation, the wall means 78 and 80 (1) will provide for mechanical rigidity of the collector; (2) reduce heat loss by conduction, convection and radiation; (3) control thermal expansion of the black liquid absorber exposing means 54; and, (4) control the maximum volume of black liquid absorber fluid per unit area carried by the elongated channel means 72 for exposing the black liquid absorber 56 to solar radiation.

The spaces 84 and 86 tend to minimize heat loss by conduction and convection while the angular configuration of the upper and lower walls 78 and 80 tend to minimize heat loss by radiation due to multiple reflections back to the black liquid absorber.

Figure 5A:
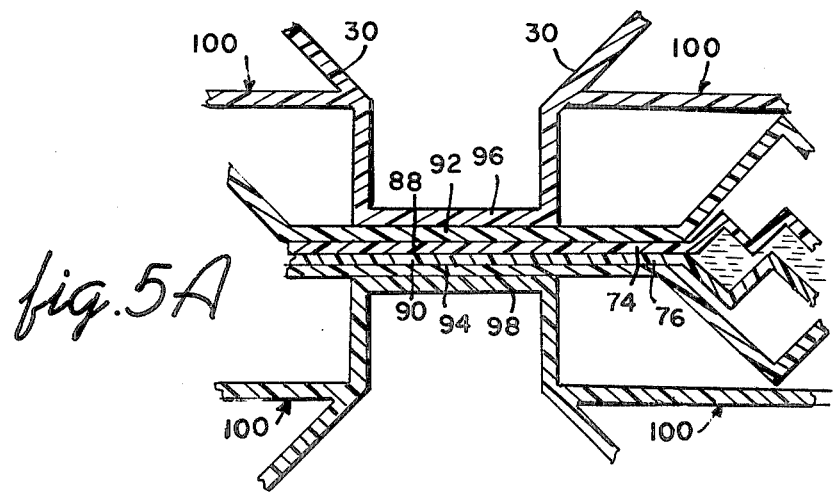
FIG. 5A is an enlarged view of the area 5A of FIG. 5.

Referring now to FIG. 5A, there is shown an enlargement of the areas A of FIG. 5 showing the assembly of the solar collector components. As shown in FIGS. 5 and 5A, the upper and lower surfaces 68 and 70 of the black liquid absorber exposing means are provided at the lateral perimeters with upper and lower rib means 88 and 90 which are sealed together to join collectors 50 together in parallel. On either side of rib members 88 and 90 and sealed thereto, are the upper and lower rib members 92 and 94, respectively, of the upper and lower wall means 78 and 80. The upper and lower cover rib members 96 and 98 are sealed to the respective upper and lower wall rib members 92 and 94.

The perimeter 100 of each prism member 30 of the upper and lower covers 60 and 64 contacts the respective area of the upper and lower wall means 78 and 80, or the upper and lower surface means 68 and 70, when the upper and lower wall means are omitted, and thereby provides additional mechanical rigidity to the solar collector assembly 48 and defines a prism heat chamber 62.

Figure 7:
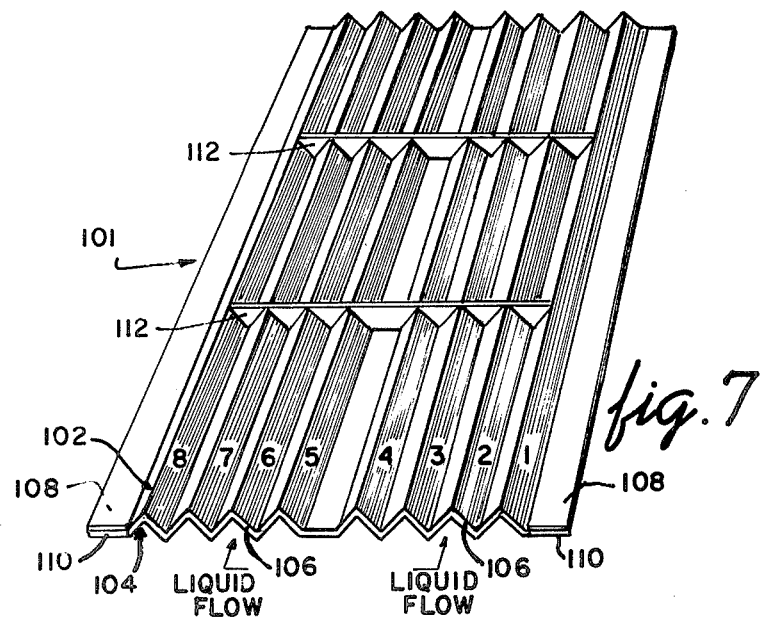
FIG. 7 is a plan view of a modified embodiment of the means for exposing the black liquid absorber to solar radiation.

Referring now to FIG. 7, there is illustrated a modified embodiment of the means for exposing the black liquid absorber to solar radiation comprising upper and lower surface members 102 and 104 defining a plurality of elongated channels 106 therebetween and provided with upper and lower sealing rib members 108 and 110 similar to those of FIGS. 5 and 5A. In this embodiment other channel means 112 are provided which are transverse to and communicate with each elongated channels 106. The transverse channels 106 provide for balancing the flow and pressure of the black liquid absorber fluid. For example, as the black liquid absorber flows into the channels 106 in the direction of the arrows from an inlet manifold (as shown in FIG. 6, for example), if the flow is greater in channels 12 and 3 than in the remaining channels, then when the liquid reaches the first transverse channel 106, it will move laterally filling channels 4, 5, 6, 7 and 8 before moving farther up the elongated channels 106. In the same manner, an imbalance in liquid or fluid pressure will be balanced. Additionally, the transverse channels 112 provide mechanical rigidity to the black liquid absorber exposing means and the solar collector assembly.

Figure 8:
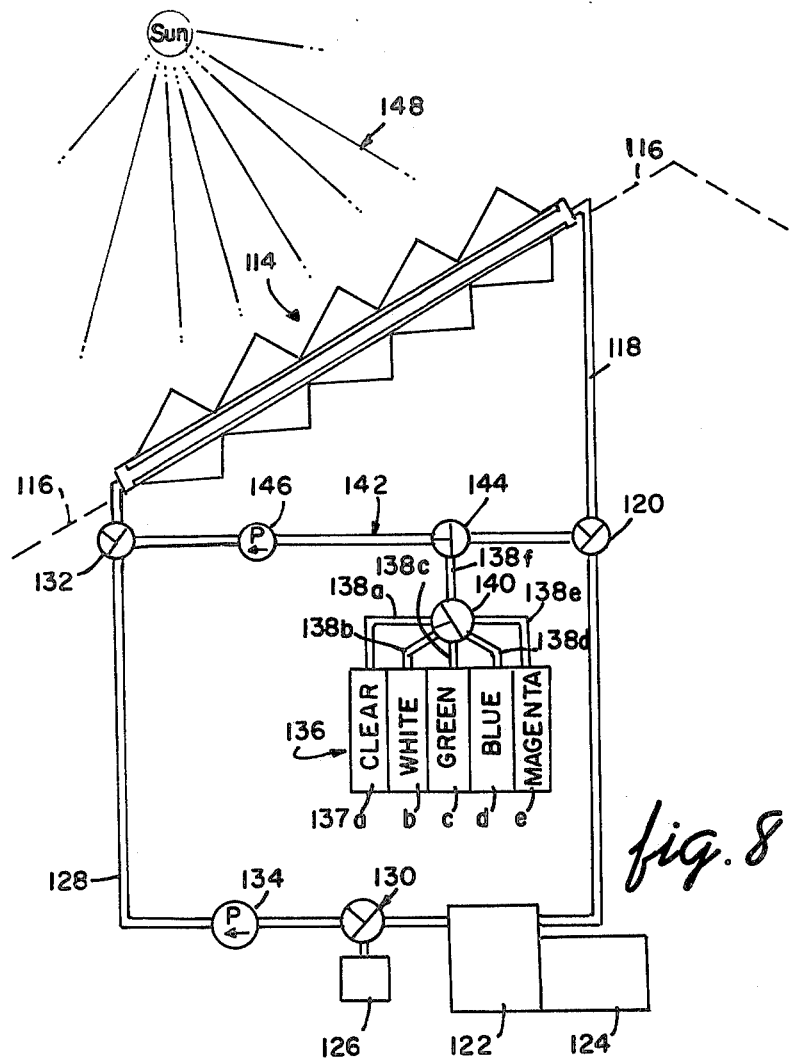
FIG. 8 is a diagrammatic, partially sectional view of one embodiment of the invention as applied to a solar energy system for a building.

Referring now to FIG. 8, there is illustrated one embodiment of the present invention as applied to a solar energy system for a building wherein a solar energy collector provided at 114 is constructed in accordance with the present invention and forms part of the roof of a building indicated by the dotted line 116. The term "collector" as used here is intended to include one or more series of collectors connected in parallel by suitable inlet and outlet manifold means as described hereinbefore. The solar collector 114 is connected by conduit means 118 and valve means 120 to suitable heat storage tank 122. The heat storage tank 122 is connected to a suitable solar heat exchanger 124. A reservoir or holding tank for the black liquid absorber is provided at 126 and is connected to the inlet end of the solar collector 114 by conduit 128 containing valve means 130 and 132 and pump means 134. A container 136 having a plurality of colored liquid containing compartments 137a, b, c, d and e is connected by suitable conduits means 138a, b, c, d, e, and f to selector valve 140 which is connected to conduit 142 containing valve means 144 and pump means 146. In operation for heating, valves 132 and 120 are turned to close off conduit 142 from conduits 128 and 118 and connect the solar collector 114, heat storage tank 122, black liquid absorber reservoir 126 and pump 134 in series. The black liquid absorber from reservoir 126 is pumped by pump means 134 to the solar collector 114 via conduit means 128 where it is exposed to solar radiation 148 as a thin curtain of liquid and heated. The heated black liquid absorber then flows to the solar heat storage tank 122 where the heat is removed by heat exchanger means 124, and the black liquid absorber is recycled. When a predetermined or desired amount of heat is stored, or temperature reached by the heat storage tank 122, the pump 134 is turned off and the black liquid absorber is allowed to drain from the system via the solar collector 114, conduit 128 and valve 130 to reservoir 126. In this manner, the collector is emptied of the black liquid absorber and is no longer heated by the solar radiation 148 and thus may serve as a skylight. The solar collector 114 may remain empty, or a colored liquid may be pumped into the collector 114 from the container 136 as follows: valves 132 and 120 are turned to connect conduit 142 with the solar collector 144. Selection valve 140 is turned to the selected colored liquid and valve 144 is turned to connect the pump 146 and the selected color liquid pumped into the collector to provide the desired aesthetic effect. When further heating is desired, the colored liquid is drained and the black liquid absorber recycled.

The solar energy collector of the present invention is preferably formed of a lightweight, high temperature resistant, high strength, clear plastic material which will transmit solar radiation. One suitable material is a clear cellulose acetate butyrate material sold under the tradename UVEX. A thickness on the order of 0.04 to 0.10 inch is suitable for forming the collector components, although greater thicknesses can be employed.

A suitable black liquid absorber may consist of a fluid such as water with a blackening agent such as carbon black dispered therein. Other suitable fluids and blackening agens may be used such as commercial anti-freeze soluations with a suitable dyeing agent well known to those skilled in the art. The main requirements being that the black liquid absorber have a low vapor pressure, be capable of being easily pumped, and have a sufficient concentration of blackening agent to maximize absorption of solar energy.

Additionally, when the collector is not employed as a dualsided collector or skylight, heat reflective means such as heat reflective coating 62 may be provided on the inner surfaces of the lower surface and wall means 70 and 80.

Since certain changes may be made in the above apparatus without departing from the scope of the invention herein involved, it is intended that all matter contained in the above description or shown in the accompanying drawing shall be interpreted as illustrative, and not in a limiting sense.

What is claimed is:

1. A solar energy collector wherein the absorber means comprises a black liquid absorber for converting solar energy to thermal energy and absorbing said thermal energy comprising an upper cover means having a base and a plurality of raised chamber modules having surfaces angularly disposed to said cover base for collecting and transmitting solar energy to said black liquid absorber, means for exposing said black liquid absorber to solar radiation comprising upper and lower surface means transparent to solar energy and defining a plurality of elongated channel means for conveying said black liquid absorber therebetween and being in abutting relationship at least along the elongated perimeters, inlet means for introducing said black liquid absorber to said channel means, outlet means for conveying away said black liquid absorber and absorbed thermal energy, and a lower cover means having a base and a plurality of raised chamber modules having surfaces angularly disposed to said cover base and corresponding to said upper cover, said upper and lower cover being disposed in abutting relationship, respectively, with said upper and lower surface means whereby said chamber modules form a plurality of heat chambers for maximizing solar energy collection and minimizing heat losses.

2. The solar energy collector of claim 1 wherein said lower cover means provides for collection and transmission of solar energy to said black liquid absorber.

3. The solar energy collector of claim 1 wherein said lower cover means is provided with means for reflecting heat to said black liquid absorber.

4. A solar energy collector of claim 1 further comprising means for interrupting circulation of said black liquid absorber through said solar energy collector whereby said solar energy collector does not convert solar energy to thermal energy and for recirculating said black liquid absorber to resume conversion of solar energy to thermal energy.

5. A solar energy collector of claim 4 providing means for selecting and introducing a colored fluid to said solar collector during said period of time when circulation of said black liquid absorber is interrupted, means providing a plurality of said colored fluids selected from the group consisting of colored and colorless, and means for removing said fluid from said solar collector.

6. A solar energy collector comprising an upper and lower cover means wherein at least the upper cover means is transparent to solar radiation, means disposed between said upper and lower cover means for exposing a black liquid absorber to solar radiation comprising upper and lower surface means defining a plurality of elongate channels means for conveying said black liquid absorber therebetween, wherein at least said upper surface means is transparent to solar radiation, inlet means for introducing said black liquid absorber into one end of said elongated channel means, outlet means at the other end of said channel means for conveying said black liquid absorber away from said channel means, upper and lower wall means disposed within said cover means and about said channel surfaces wherein at least the upper wall means is transparent to solar radiation and having the configuration and being positioned relative to said channel surfaces so that when said collector is exposed to solar radiation said wall means (1) will provide for mechanical rigidity of said collector; (2) minimize heat loss by conduction, convection and radiation; (3) control thermal expansion of said channel surfaces, and (4) control the volume of black liquid absorber per unit area carried between said channel surfaces.

7. A solar energy collector comprising an upper and lower cover means wherein at least the upper cover mean has a plurality of raised heat chamber modules each having surfaces angularly disposed to the cover surface and transparent to solar radiation, means disposed between said upper and lower cover means for exposing a black liquid absorber to solar radiation comprising upper and lower surface means defining a plurality of elongated channels means for carrying said black liquid absorber therebetween wherein at least said upper surface means is transparent to solar radiation, inlet means for introducing said black liquid absorber to one end of said elongate channel means, outlet means at the other end of said channel means for conveying said black liquid absorber away from said channel means, wall means disposed within said cover means and about said channel surfaces wherein at least the upper wall means is transparent to solar radiation and having the configuration and being positioned relative to said channel surfaces so that when said collector is exposed to solar radiation said wall means (1) will provide for mechanical rigidity of said collector; (2) minimize heat loss by conduction, convection and radiation, (3) control thermal expansion of said channel surfaces, and (4) control the volume of black liquid absorber per unit area carried between said channel surfaces.

8. A dual-sided solar energy collector comprising an upper and lower cover means transparent to solar radiation, means disposed between said upper and lower cover means for exposing a black liquid absorber to solar radiation comprising upper and lower surfaces means transparent to solar energy and defining a plurality of elongate channels means for conveying said black liquid absorber therebetween, inlet means for introducing said black liquid absorber into one end of said elongated channel means, outlet means at the other end of said channel means, upper and lower walls means disposed about said channel surfaces transparent to solar radiation and having a configuration and being positioned relative to said channel surfaces so that when said collector is exposed to solar radiation said wall means (1) will provide for mechanical rigidity of said collector; (2) minimize heat loss by conduction, convection and radiation; (3) control thermal expansion of said channel surfaces, and (4) control the volume of black liquid absorber per unit area carried between said channel surfaces.

9. A solar to thermal energy converter for use in solar energy collector systems comprising upper and lower surfaces transparent to solar energy and defining a plurality of elongate channel means therebetween for exposing a solar energy absorber heat transfer fluid to solar radiation, a solar energy absorber heat transfer fluid comprising a black liquid absorber for converting solar energy to thermal energy and absorbing said thermal energy upon exposure to solar radiation, inlet means for introducing said black liquid absorber to said channel means, means for passing said black liquid absorber through said channel means, outlet means for conveying said black liquid absorber and absorbed thermal energy away from said channel means, said upper and lower channel surface means being sufficiently flexible to accommodate thermal expansion, upper and lower wall means disposed within said cover means and about said channel surfaces wherein at least the upper wall means is transparent to solar radiation and having the configuration and being positioned relative to said channel surfaces so that when said collector is exposed to solar radiation said wall means (1) will provide for mechanical rigidity of said collector; (2) minimize heat loss by conduction, convection and radiation; (3) control thermal expansion of said channel surfaces, and (4) control the volume of black liquid absorber per unit area carried between said channel surfaces.

10. A solar to thermal energy converter for use in solar energy collector systems comprising an upper and lower surfaces transparent to solar energy and defining a plurality of elongate channel means therebetween for exposing a solar energy absorber heat transfer fluid to solar radiation, a solar energy absorber heat transfer fluid comprising a black liquid absorber for converting solar energy to thermal energy and absorbing said thermal energy upon exposure to solar radiation, inlet means for introducing said black liquid absorber to said channel means, means for passing said black liquid absorber through said channel means, outlet means for conveying said black liquid absorber and absorbed thermal energy away from said channel means, said upper and lower channel means surface being sufficiently flexible to accommodate thermal expansion, and means disposed in said upper and lower surfaces defining conduit means transverse to said channel means and communicating with said channel means for adjusting the pressure and flow of said black liquid absorber along said channel means.

* * * * *